July 20, 1943.  A. A. SCARLETT  2,324,883
ROD WEEDER SHOE
Filed Dec. 31, 1940

Inventor
Arthur A. Scarlett.
By Paul O. Pippel
Att'y.

Patented July 20, 1943

2,324,883

UNITED STATES PATENT OFFICE 2,324,883

ROD WEEDER SHOE

Arthur A. Scarlett, Hamilton, Ontario, Canada, assignor, by mesne assignments, to International Harvester Company, Chicago, Ill., a corporation of New Jersey Application December 31, 1940, Serial No. 372,581

3 Claims. (Cl. 308—37)

This invention relates to rotary rod weeder shoes and more particularly to means for holding a wooden, or the like, bushing therein.

In the class of agricultural implements in which subsoil rotary rods are utilized, the provision of bearings for the rotary rods is one of the major problems. Since the rotary rods operate beneath the soil, the bushing thereof soon becomes worn and must be replaced, and it is desirable that these wood bushings be replaced in a simple and inexpensive manner.

It is, therefore, the principal object of this invention to provide a novel means for holding a bushing in a rod weeder shoe.

Another object of the present invention is to provide a novel means which will permit the wood bushing of a rod weeder shoe to be easily replaced.

According to the present invention, the bushing is made of wood, or equivalent material, and is held in the rod weeder shoe by a retainer clip which is adapted to be inserted between the shoe and the bushing. The ends of the retainer are bent so as to hold the wood bushing in place.

A more complete understanding of the invention may be had from the following detailed description with reference to the accompanying sheet of drawings.

Figure 1:
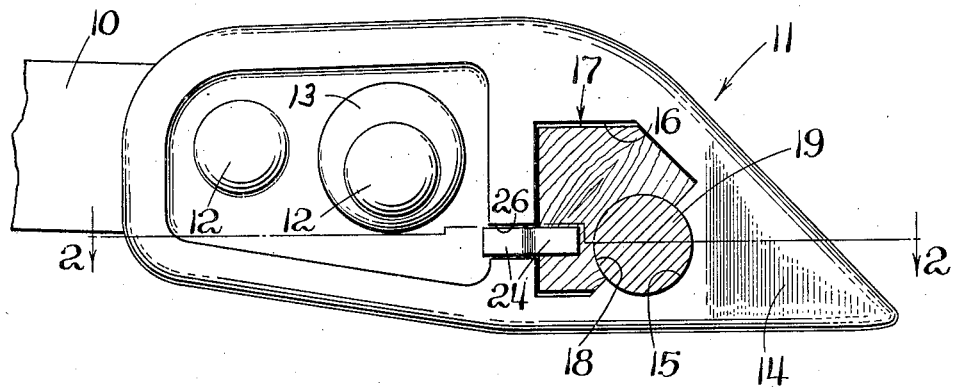
Figure 1 is a side elevational view of a rod weeder shoe in which the usual weeder rod is mounted, and showing the wood bushing mounted therein.

As shown in Figure 1, at the end of a shank 10 is secured a rod weeder shoe 11, by means of bolts 12. One of the bolts 12 is provided with an adjustable part 13 by which the rod weeder shoe 11 may be adjusted about the other bolt 12. This construction is similar to that shown in applicant's Patent No. 2,125,359 of August 2, 1938. The forward portion of the rod weeder shoe 11 converges to a point 14, at the rear of which is provided a transverse semicircular recess 15 and an opening 16. Within the opening 16, a bushing 17 is adapted to be fitted. The bushing 17 also has a transverse semicircular portion 18, which is placed adjacent the transverse semicircular opening in the rod weeder shoe 11. The semicircular openings 15 and 18 form an opening in which a weeder rod 19 is inserted. The weeder rod may be driven in any well known manner. It will be apparent that, when the weeder rod 19 is driven, and when the rod weeder shoe is operating beneath the soil, the pressure on the ground will tend to move the weeder rod 19 rearwardly and upwardly against the wood bushing 17. This is desirable since the wood bushing 17 will be worn, and not the weeder rod 19 or the semicircular opening 15 in the rod weeder shoe 11.

Figure 2:
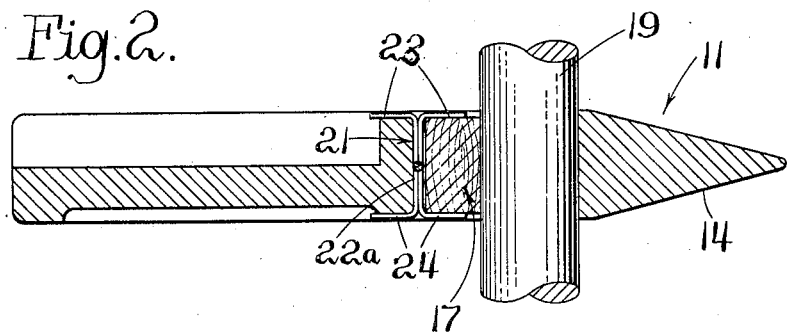
Figure 2 is a sectional view taken along the line 2—2 of Figure 1.
Figure 3:
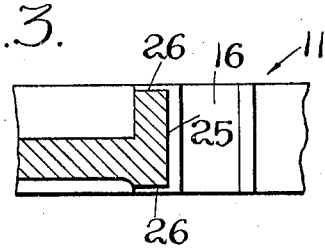
Figure 3 is a partial sectional view showing the construction of the rod weeder shoe by which the retainer holds the wood bushing in the shoe; and, Figure 4 is a perspective view of the retainer.
Figure 4:
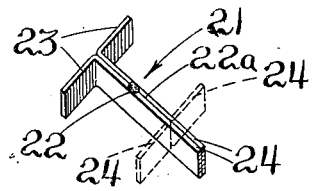

The wood bushing 17 is held within the rod weeder shoe 11 by a retainer 21, which consists of two strips of metal that are secured together by a spot-weld 22. The ends of the retainer 23 are bent at substantially a right angle to the mid-portion 22a of the retainer. The other ends 24 extend outwardly in a straight line from the mid-portion 22a of the retainer 21. The rod weeder shoe 11, at the rear of the opening 16, is provided with a transverse slot 25, from which extend longitudinally disposed recesses 26. As shown in Figure 2, the retainer 21 is inserted in the transverse slot 25 so that the ends 23 contact the longitudinal recesses 26 at one side of the rod weeder shoe 11 and one side of the wood bushing 17. The other ends 24 of the retainer 21 are then bent at approximately a right angle to the mid-portion 22a of the retainer 21—one of the ends 24 fitting in the longitudinal recess 26 at the other side of the rod weeder shoe 11, and the other end 24 contacting the other side of the wood bushing 17. When the ends of the retainer 21 are bent, as has just been described, the wood bushing 17 is securely held within the rod weeder shoe 11. In the event that the bushing 17 becomes worn and needs to be replaced, either the ends 23 or the ends 24 may be bent so as to permit removal of the wood bushing 17. After a new bushing has been inserted, either the ends 23 or 24 may then be bent to their former position.

From the foregoing description it will be apparent that a novel retaining means has been provided for holding the wood bushing in a rod weeder shoe. The retainer 21 securely holds the bushing in place when the rod weeder shoe is in operation in the ground, and permits quick removal of the wood bushing when it needs to be replaced.

It will be understood that, while a preferred embodiment of the structure has been illustrated and described, numerous modifications and alterations may be made without departing from the spirit and scope of the invention as defined in the appended claims.

What is claimed is:

1. In a rod weeder shoe having an opening in which a bushing is fitted, means for holding said bushing in said shoe, comprising a retainer consisting of two pieces of metal secured together intermediate the ends thereof and positioned transversely between the bushing and the shoe and having its ends bent over into engagement with the bushing and the shoe.

2. In a rod weeder shoe having an opening in which a bushing is fitted, means for holding the bushing in the shoe, comprising a transverse sheet-metal strip positioned between the bushing and the shoe and having its ends bent into engagement with the bushing and the shoe.

3. In a rod weeder shoe having an opening in which a bushing is fitted, means for holding the bushing in the shoe, comprising a sheet-metal retainer strip positioned between the bushing and the shoe and having a portion adapted to engage the shoe and another portion projecting to engage the bushing.

ARTHUR A. SCARLETT.